United States Patent

[11] 3,590,855

| [72] | Inventors | Charles E. Woollen<br>Clayton;<br>Robert W. Boehlow, Florissant, both of, Mo. |
|---|---|---|
| [21] | Appl. No. | 812,276 |
| [22] | Filed | Apr. 1, 1969 |
| [45] | Patented | July 6, 1971 |
| [73] | Assignee | Multiplex Company<br>St. Louis, Mo. |

[54] REMOTE-SUPPLY LIQUID DISPENSING SYSTEM
27 Claims, 25 Drawing Figs.

[52] U.S. Cl. .................................................. 137/375,
285/137, 222/146, 222/318, 138/111
[51] Int. Cl. .................................................. F16l 39/02
[50] Field of Search ........................................... 222/146,
318; 285/74, 75, 129, 129.1, 132, 135, 131, 137;
137/375; 138/111; 339/184

[56] References Cited
UNITED STATES PATENTS

| 2,837,749 | 6/1958 | Gross | 285/137 X |
| 2,965,136 | 12/1960 | Burris et al. | 285/137 X |
| 3,011,681 | 12/1961 | Kromer | 222/146 X |
| 3,216,445 | 11/1965 | Cornelius | 137/594 |
| 3,282,612 | 11/1966 | Younger | 285/137 |
| 3,305,249 | 2/1967 | Zahuranec | 285/137 X |

FOREIGN PATENTS

| 745,916 | 5/1944 | Germany | 285/137 |

*Primary Examiner*—Henry T. Klinksiek
*Attorney*—Koening, Senniger, Power & Leavitt

ABSTRACT: A remote-supply liquid-dispensing system in which a plurality of counter-mounted dispensing units, each having a plurality of dispensing valves for dispensing different liquids, are supplied with liquids (e.g., syrups, carbonated water, plain water, beer, hot or cold coffee, etc.) from a temperature control unit at a location remote from the dispensing units via a system of thermally insulated fittings and conduits each having a plurality of tubes therein for the respective liquids, with quick-attachable couplings between the ends of the conduits and the fittings adapted for simultaneous quick connection of all the tubes in a conduit to all the tubes in a fitting, with the tubes for the respective liquids in the conduits and fittings in proper register, also the multiple-tube conduit and fittings used in the system.

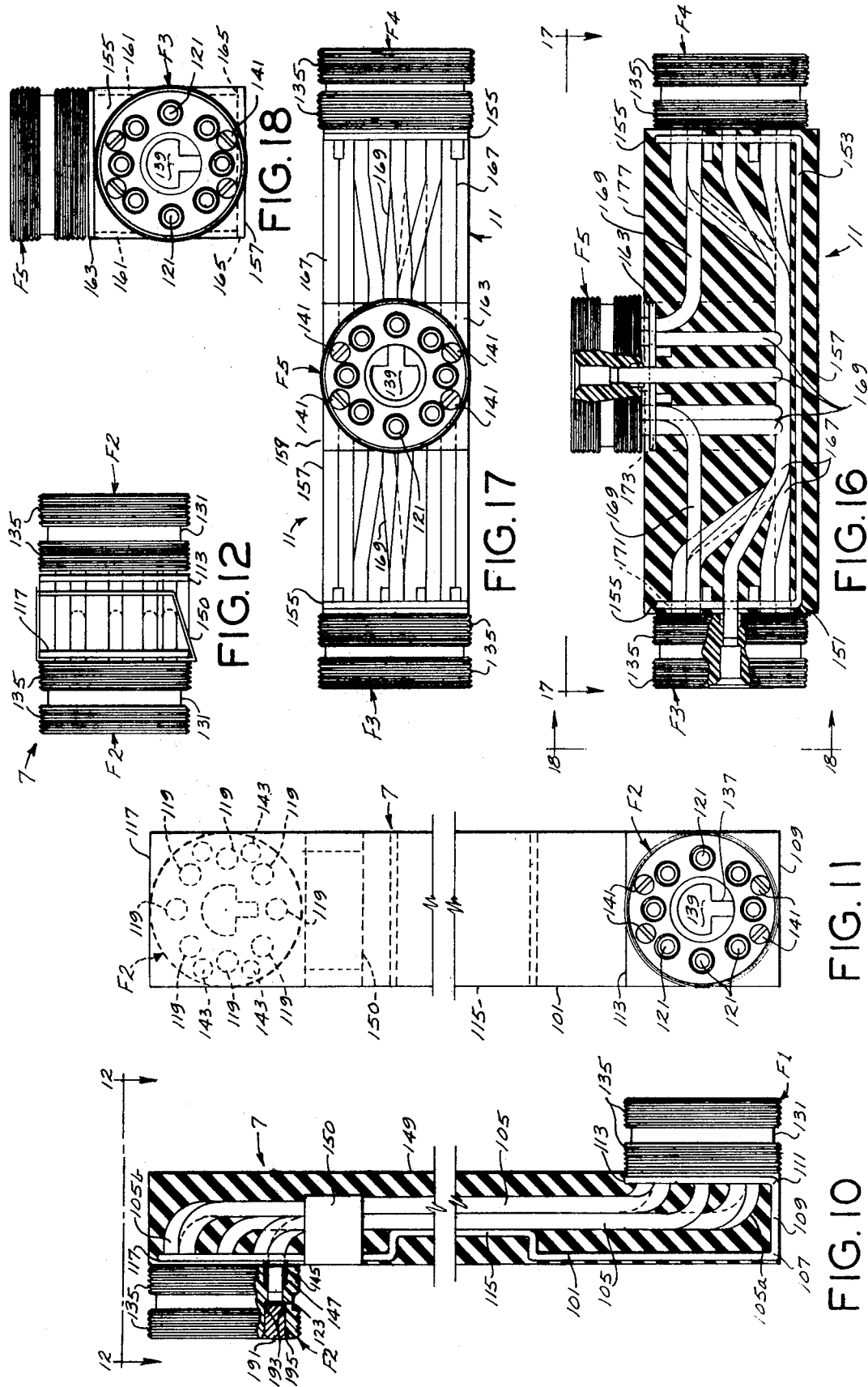

3,590,855

REMOTE-SUPPLY LIQUID DISPENSING SYSTEM

BACKGROUND OF THE INVENTION

This invention relates to a remote-supply liquid-dispensing system, and more particularly a remote-supply beverage-dispensing system, i.e., a system in which a plurality of dispensing units each having a plurality of dispensing valves are supplied with liquids from a temperature control unit (for cooling or heating the liquids) at a location remote from the dispensing units, and to conduits and fittings used in the system.

The invention is particularly concerned with systems such as described in which beverage-dispensing units are typically mounted at spaced locations on a counter or counters in a counter area of an establishment such as a restaurant, and supplied with syrups and carbonated water (in the case of postmix systems) or with carbonated beverages (in the case of premix systems) from supplies in a remote area of the establishment (e.g., a kitchen area). Generally, such a system involves the provision of a refrigeration unit in the remote area, through which liquids flow for cooling, and conduit for delivery of the liquids to the dispensing units. In the case of a postmix system, the liquids would include various beverage syrups and carbonated water; in the case of a premix system, the liquids would be premixed carbonated beverages. Heretofore, such installations have been made by running separate individual liquid lines from the refrigeration unit to the dispensing units, these lines using tubes cut to fit on the job with the various tubes individually connected at their ends to the refrigeration unit, to various fittings, and to the dispensing units. This prior mode of installation, involving the necessity for individually connecting the ends of many tubes to the refrigeration unit, fittings and dispensing units has been time consuming and costly.

SUMMARY OF THE INVENTION

Among the several objects of this invention may be noted the provision of a remote-supply liquid-dispensing system, and more particularly a beverage system, adapted for quick and simplified installation to minimize installation time and cost; the provision of such a system wherein installation time and cost are minimized by use of prefabricated multiple-tube conduit and fittings with quick-attachable couplings for connection in one rapid simple operation of the ends of all tubes in a conduit to the respective ends of all tubes in a fitting; the provision of such a system wherein the tubes for the respective liquids in the respective conduits and fittings are automatically registered upon assembly; the provision of such a system wherein the connections may be easily made without the use of tools; and the provision of such a system wherein the couplings may be disconnected and reconnected many times (e.g., for cleaning of the tubes) without any necessity for replacement of seals; and the provision of such a system wherein the couplings are of economical and sanitary construction.

In general, the invention involves a distribution system for a liquid-dispensing installation (e.g., a cold beverage-dispensing installation) wherein a plurality of liquids are to be delivered from supplies thereof through a liquid temperature control unit (e.g., a refrigeration unit) to dispensing units each having a plurality of dispensing valves, the liquid temperature control unit being at a location remote from the dispensing units. A plurality of multiple-tube conduits and multiple-tube fittings are provided for conducting the liquids from the liquid temperature control unit to the dispensing units. Each of the conduits and fittings comprises an assembly of tubes for individually conducting the respective liquids. Each of the conduits includes a sleeve of flexible thermal insulation material sleeved around the tubes thereof with the tubes in heat exchange relation with one another within the sleeve. Each of the conduits has coupling means at the ends thereof including a plurality of terminals, one for each tube in the conduit, to which the ends of the tubes in the conduit are connected. Each of the fittings has coupling means at the ends thereof including a plurality of terminals, one for each tube in the fitting, to which the ends of the tubes in the fitting are connected. The coupling means on the conduits mate with the coupling means on the fittings, and means is provided for interconnecting the coupling means of the conduits and the fittings. Other objects and features will be in part apparent and in part pointed out hereinafter.

BRIEF DESCRIPTION OF THE DRAWINGS

FIG. 10 is a view in side elevation, with parts broken away and shown in section, of a multiple-tube S-fitting of the system;

FIG. 11 is a view of the right side of the FIG. 10 S-fitting;

FIG. 12 is a plan of FIG. 10;

FIG. 16 is a side elevation, with parts broken away and shown in section, of a multiple-tube T-fitting of the system;

FIG. 17 is a plan of the FIG. 16 T-fitting, with certain insulation removed;

FIG. 18 is an end elevation of the FIG. 16 T-fitting;

Corresponding reference characters indicate corresponding parts throughout the several views of the drawings.

DESCRIPTION OF THE PREFERRED EMBODIMENTS

Figure 1:
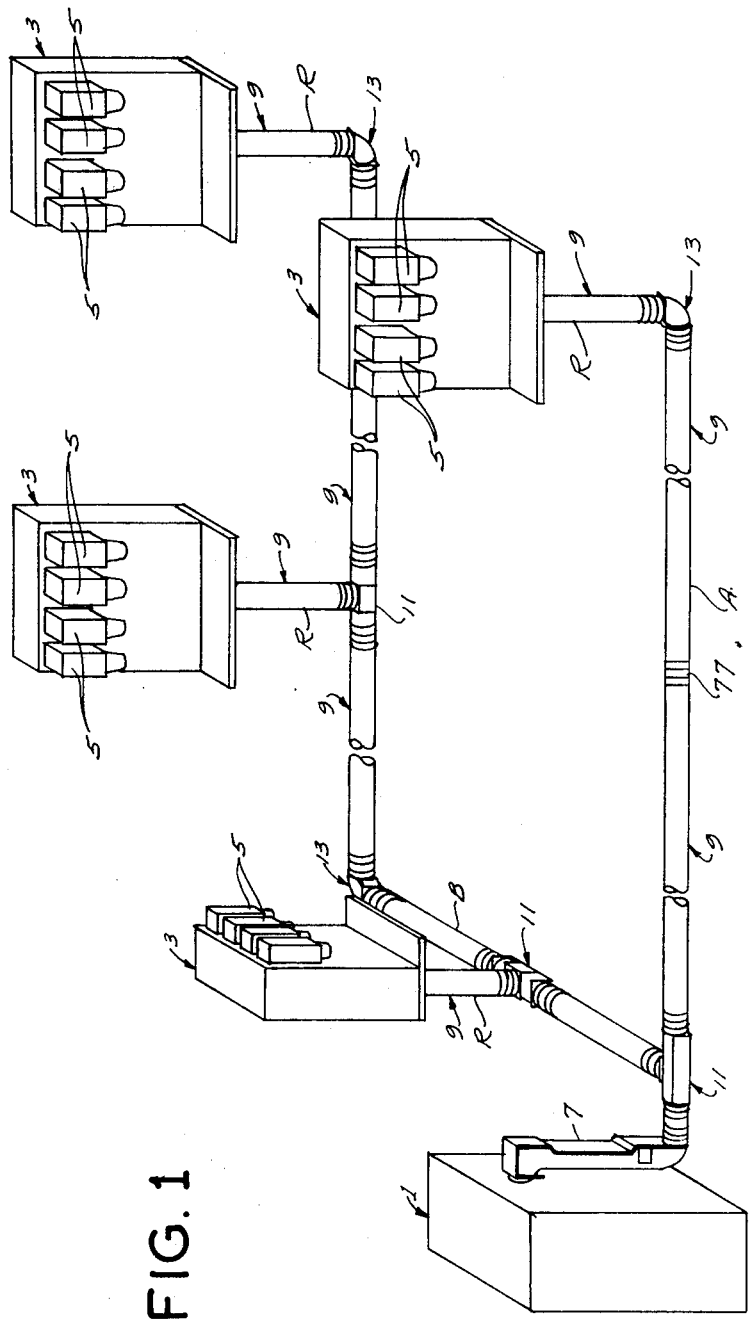
FIG. 1 is a view generally showing a distribution system of this invention, including a refrigeration unit, multiple-tube conduits, multiple-tube fittings and counter-mounted dispensing units.

Referring first more particularly to FIG. 1 of the drawings, there is shown a distribution system of this invention for a cold beverage installation wherein a plurality of liquids are to be delivered from supplies thereof through a refrigeration unit to a plurality of dispensing units each having a plurality of dispensing valves. The installation, as illustrated, may involve a remote-supply postmix system, FIG. 1 showing a refrigeration unit 1 for refrigerating beverage syrups flowing through the unit from individual supplies thereof (not shown) and for refrigerating carbonated water from a carbonator (not shown). The syrups and carbonated water are individually delivered from the refrigerator unit 1 to a plurality of beverage-dispensing units such as indicated at 3. These dispensing units 3, as will be understood, are at various locations on a counter or counters in the restaurant or other establishment in which the system is installed. Each unit 3 comprises a plurality of dispensing faucets 5. As will be understood in the art, each of these faucets is supplied with a syrup and carbonated water and, when opened, dispenses syrup and carbonated water, the syrup and water mixing to form a drink. The refrigeration unit 1, together with the containers for supplies of syrup and the carbonator, are located in a room remote from the counter area. The syrups and carbonated water are conducted from the remote-located refrigeration unit 1 to the counter beverage dispensing units 3 via a system of multiple-tube conduits and multiple-tube fittings, including a multiple-tube S-fitting 7 for delivery of syrups and water downward from the syrup and water outlets of the refrigeration unit, multiple-tube conduits each generally designated 9, multiple-tube T-fittings each generally designated 11, and multiple-tube elbow fittings each generally indicated 13. The fittings provide for interconnection of conduits to provide a main line A of multiple-tube conduit extending from the lower end of the S-fitting 7, one or more branch lines B of multiple-tube conduit extending from the main line, and multiple-tube riser conduits R extending upward from the main and branch lines to the dispensing units 3. It will be understood that, in a typical installation, lines A and B will extend along the floor under counter units on which dispensing units 3 are mounted.

Figure 2:
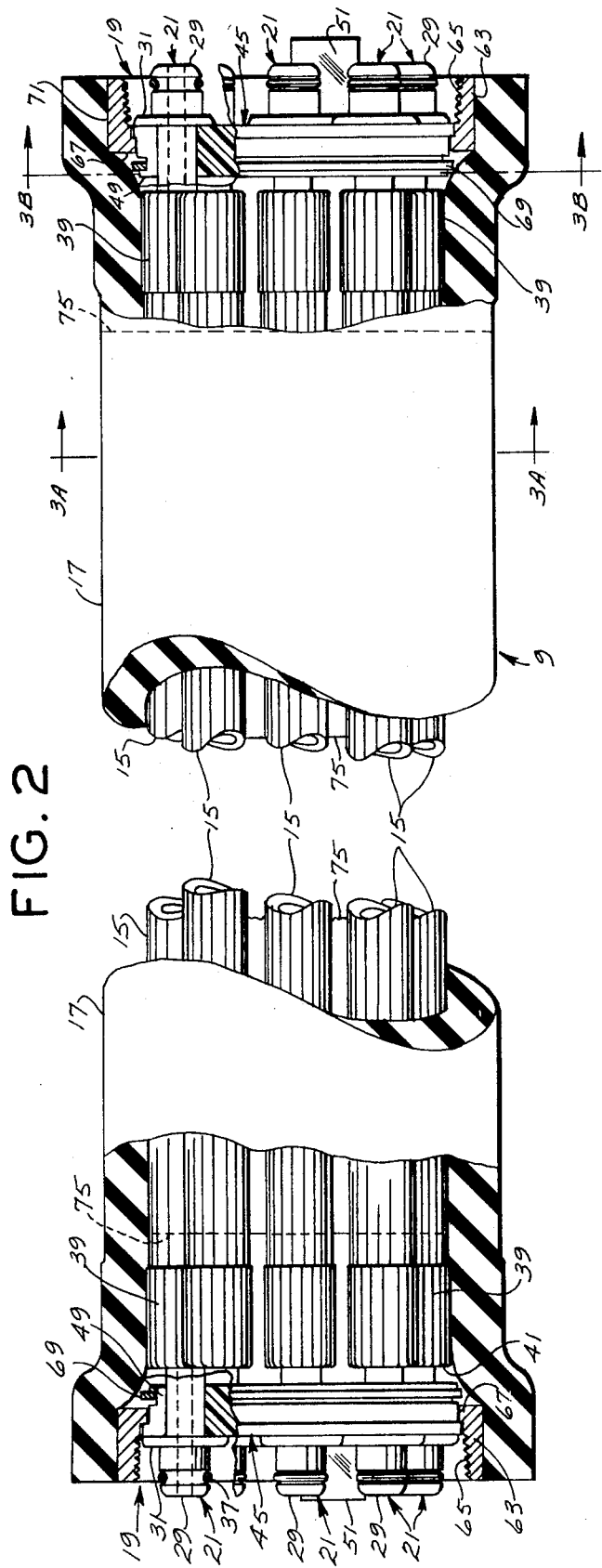
FIG. 2 is a view, with parts broken away and shown in section, illustrating a multiple-tube conduit of the system.
Figure 2A:
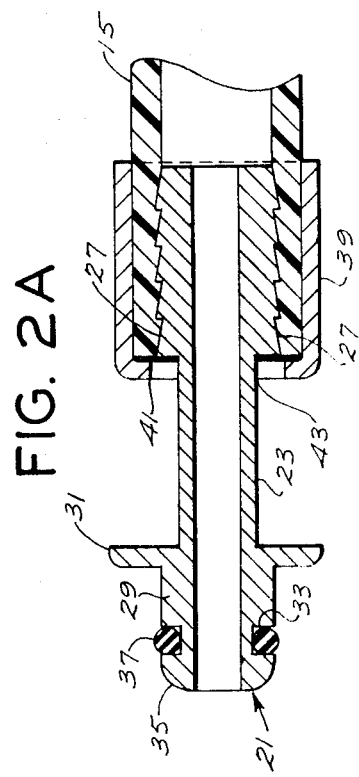
FIG. 2A is a section showing a detail at the end of a conduit.
Figure 3A:
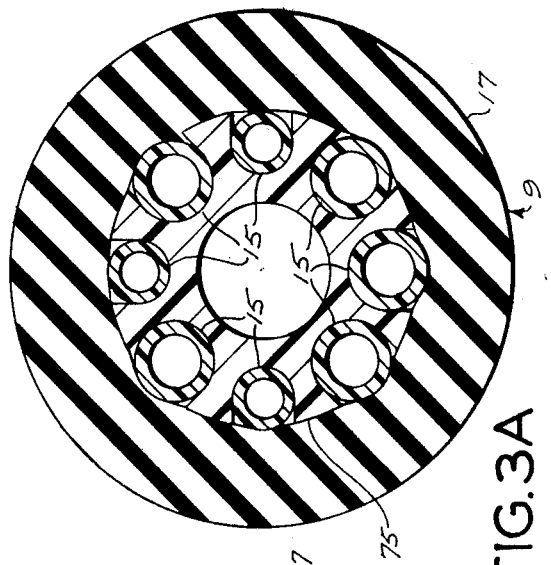
FIG. 3A is a transverse section on line 3A–3A of FIG. 2, showing a fluted spacer.
Figure 3:
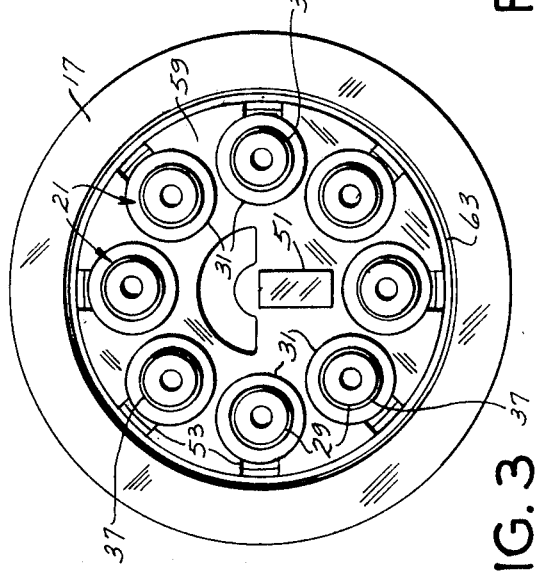
FIG. 3 is an end view of the coupling means at the end of a conduit.
Figure 3B:
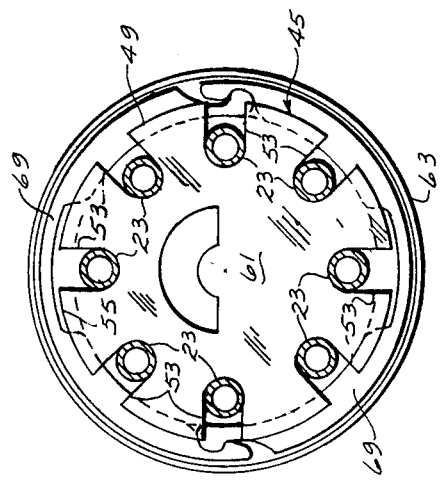
FIG. 3B is a transverse section on line 3B–3B of FIG. 2, with certain insulation omitted.

Referring to FIGS. 2 and 3A, a multiple-tube conduit 9 such as used in the system is shown to comprise an assembly of a plurality of individual plastic tubes, each designated 15, for individually conducting the respective liquids, these tubes being encased in a thermal insulation jacket 17. At each end of the conduit is a male coupling means 19 including a plurality of terminals 21, one for each tube in the conduit, to which the ends of the tubes in the conduit are connected. As shown, there are eight such tubes in the conduit, and eight terminals 21 at each end of the conduit. Each terminal 21 has a tubular stem 23 having an enlarged diameter inner end portion 25 provided with annular barbs or ribs 27 (see FIG. 2A). This enlarged barbed or ribbed portion 25 is inserted in the end of a tube and has a tight sealing fit therein. At the outer end of the stem is an enlarged diameter cylindric nose 29 (also tubular) with an outwardly projecting lateral circular flange 31 at the inner end (the base end) of the nose. The latter has an annular peripheral groove 33 adjacent its outer end, which it tapers as indicated at 35. A packing ring 37, specifically a rubber O-ring, is received in this groove, the outer diameter of this ring being somewhat greater than the outer diameter of the nose. A metal ferrule 39 is provided on each end of each plastic tube 15, the ferrule having an end head 41 provided with a center hole 43 receiving the stem. This head 41 is spaced from the flange 31.

Figure 5:
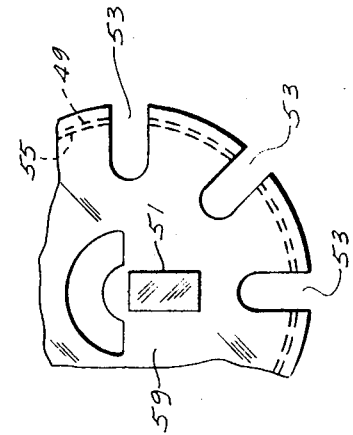
FIG. 5 is a fragmentary view of one face of the FIG. 4 head, as viewed from the right side of FIG. 4.
Figure 4:
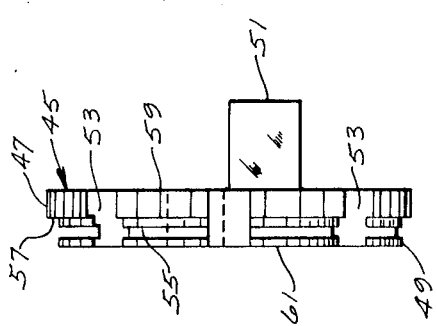
FIG. 4 is a side elevation of a head member used at each end of a conduit.
Figure 6:
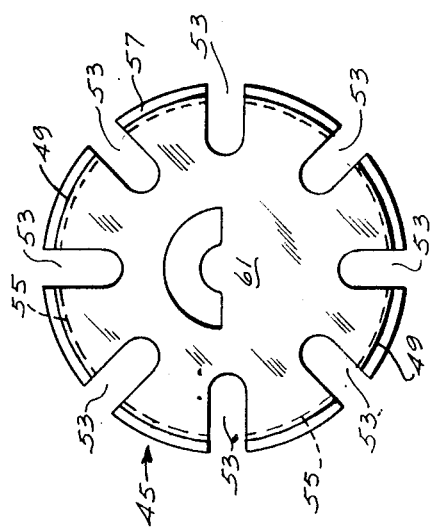
FIG. 6 is a view of the other face of the FIG. 4 head, as viewed from the left side of FIG. 4.

Each male coupling means or unit 19 comprises a circular head 45 in the form of a disc (see FIGS. 4—6) which may be molded of a suitable plastic material such as an acetal resin. This head or disc 45 has a main circular body portion 47 with a peripherally grooved circular reduced diameter extension 49 on one face of the body portion (constituting its inner face) and a tongue 51 of rectangular cross section projecting from its other face (its outer face). This tongue constitutes a key for registering the male coupling unit 19 with a female coupling means, as will appear. The disc 45 has a plurality of slots 53 extending radially inward from its periphery, spaced at equal intervals therearound, for receiving the stems 23 of the terminals 21 at the ends of the plastic tubes 15. There being eight plastic tubes, there are eight such slots in the disc, spaced at 45° intervals around the disc. Each slot 53 is slightly wider than the stem 23. The slots are of such length as to extend radially into the extension 49 from the outer periphery of the extension 49 a distance somewhat greater than the diameter of stem 23. The peripheral groove in the extension is designated 55. It is located in the central transverse plane of the extension. The inside face of the body portion of the disc which surrounds the extension constitutes a shoulder and is designated 57.

The stems 23 of the terminals 21 on the eight plastic tubes 15 are inserted in the slots 53 in the disc 45, with the flanges 31 of the terminals 21 on the outside face 59 of the disc and the heads 41 of the ferrules 39 on the ends of the plastic tubes on the inside face 61 of the extension 49. A coupling nut 63 constituted by a cylindric ring internally threaded as indicated at 65 is applied in position surrounding the body portion 47 of the disc 45. This nut has an inwardly directed annular flange 67 at one end thereof (its inner end) which is held in position against the shoulder 57 by a fastener constituted by a retaining ring 69 snapped into the groove 55 in the extension. The retaining ring holds the terminals 21 in the slots 53 in the disc 45. Each terminal is held against endwise or axial movement (within tolerance limits) relative to the disc by engagement of flange 31 on the fitting with the outside face 59 of the disc and by engagement of the end 41 of ferrule 39 with the face 61 of the extension. The periphery 71 of the nut may be knurled and recesses (not shown) may be provided in its periphery for application of a spanner wrench to turn it, if desired.

The thermal insulation jacket 17 of the conduit 9 consists of a tube of foam rubber material, which is flexible, and which is sleeved around the plastic tubes 15. As shown in FIG. 2, the insulation jacket or sleeve 17 is made of such length as to reach at its ends around the coupling nuts 63 at the ends of the conduit. It will be understood, however, that the foam rubber material of the jacket or sleeve is sufficiently soft and resilient that the ends of the jacket or sleeve can be readily squeezed back off the coupling nuts for access to the latter. Fluted spacers 75, which may be molded of suitable plastic, may be provided at appropriate intervals along the length of the conduit to hold the plastic tubes in circular array in heat exchange relation with one another within the jacket or sleeve, the plastic tubes lying in the flutes of the spacers (see FIG. 3A).

Figure 9:
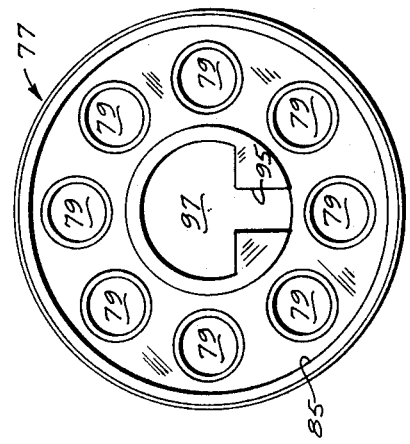
FIGS. 8 and 9 are views of the left and right faces, respectively, of the FIG. 7 union.
Figure 7:
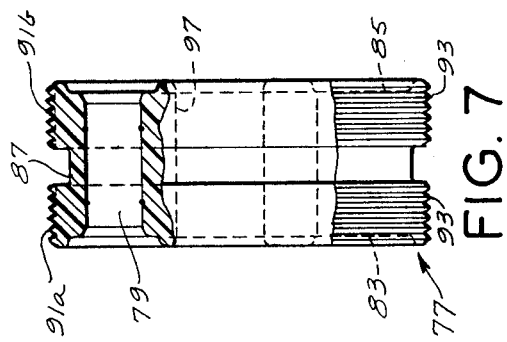
FIG. 7 is a side elevation, partly broken away and shown in section, of a union which may be used in conjunction with the conduits.
Figure 8:
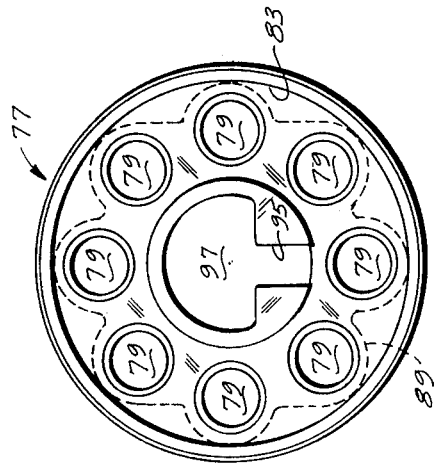
Figure 15:
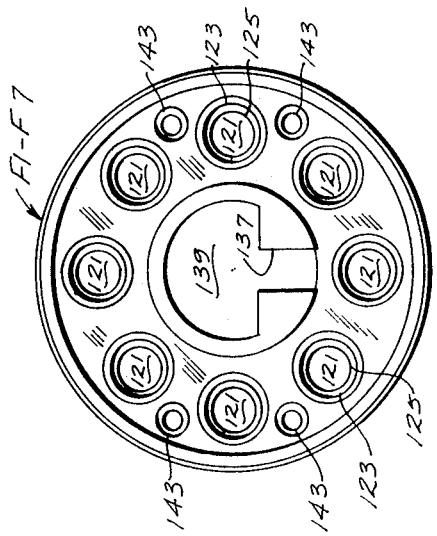
FIGS. 14 and 15 are views of the left and right faces of the coupling element of FIG. 13.
Figure 13:
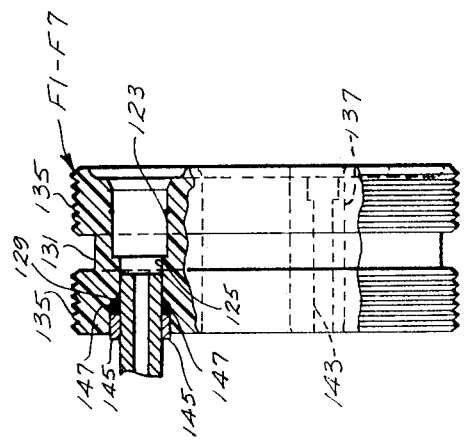
FIG. 13 is a side elevation, partly broken away and shown in section, of a coupling element used on the FIG. 10 S-fitting and on other fittings of the system, the coupling element being shown on a larger scale than in FIGS. 10–12.
Figure 14:
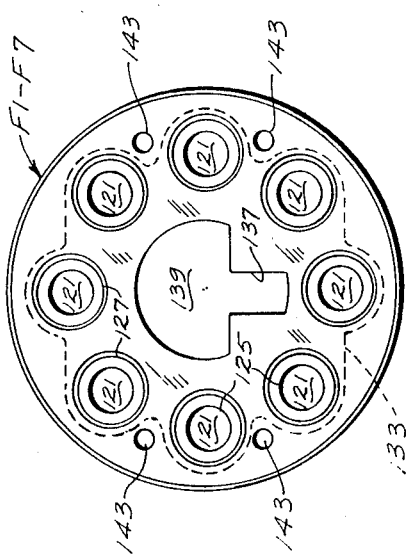

Referring to FIGS. 7—9, there is indicated at 77 a union for effecting coupling of two male coupling units 19. This union, as shown, comprises a generally cylindric body, preferably molded of a plastic material, having a series of holes 79 extending endwise therethrough from one face of the body to the other, spaced at intervals around the axis of the body corresponding to the spacing of the fittings 21. Each of the holes has a diameter slightly greater than that of the nose 29 of a terminal 21, but somewhat less than the external diameter of the O-ring 37 on a fitting. The length (i.e., the axial dimension) of the union 77 is somewhat greater than twice the length of the nose 29, the ends of the holes constituting sockets for reception of noses 29 of the coupling units of two conduits 9. The end faces of the union preferably are relieved by annular grooves 83 and 85, and the union also preferably has a peripheral groove 87 centrally of its length, this groove having a bottom formation such as indicated at 89 in FIG. 8 indented between the holes. The end portion 91a of the union on one side of the groove 87 is externally threaded as indicated at 93, and the end portion 91b of the union on the opposite side of the groove is also externally threaded as indicated at 93, with these threads matching the internal thread of the coupling nut 63. The union has a keyway 95 extending therethrough from one of its end faces to the other for receiving the keys of two coupling units 19, this keyway extending radially of the union from a part-circular hole 97 therein.

Referring to FIGS. 10—15, the S-fitting 7 is shown to comprise an elongate rigid support 101 carrying oppositely directed female coupling elements each designated generally by the reference character F and specifically designated F1 and F2, at opposite ends thereof, with a plurality of S-shaped metal tubes 105 (e.g., stainless steel tubes) extending between said elements. As herein illustrated, there are eight such tubes. The support 101, as shown, comprises a relatively wide metal bar of relatively thin rectangular cross section bent at 107 to provide a portion 109 extending at right angles to the bar and bent again at 111 to provide a flat end portion 113 extending at right angles to portion 109 in the direction back toward the other end of the bar. The bar is also shown as having an intermediate portion 115 offset in the direction toward the plane of the bent-back end portion 113. This provides a flat end portion 117 at the end of the bar opposite end portion 113. Each of these flat end portions 113 and 117 is provided with a series of eight holes each designated 119 arranged around a circle corresponding to the arrangement of the eight fittings 21 on a coupling unit 19.

Each of the female coupling elements F1 and F2 (these being identical) comprises a generally cylindric body, preferably molded of a plastic material, having a series of eight holes 121 extending endwise therethrough from one face of the body to the other, arranged in correspondence with holes 119 in the end portions 113 and 117 of the bar 101. Each of these holes 121 has an outer end terminal portion or socket 123 dimensioned for receiving a terminal 21, a reduced diameter intermediate portion 125, and an inner end portion 127 of a diameter larger than that of the intermediate portion and having a tapered inner end 129. The element preferably has a peripheral groove 131 centrally of its length, this groove having a bottom formation such as indicated at 133 in FIG. 14 indented between the holes. The cylindric end portions of the element on opposite sides of groove 131 are externally threaded as indicated at 135, matching the threading on coupling nuts 63. The element also has a keyway 137 extending therethrough from one of its end faces to the other (like keyway 95) for receiving the key of a coupling unit 19. Keyway 137 extends radially from a part-circular hole 139 in the female coupling element.

The intermediate portions of the metal tubes 105 extend lengthwise of the bar 101 on what may be termed the inside of the intermediate portion 115 of the bar. At one end of the bar, the metal tubes have ends 105a bent at right angles to the main lengths of the tubes extending through the holes 119 in the bent-back end portion 113 of the bar. At the other end of the bar, the metal tubes have ends 105b bent at right angles to the main lengths of the tubes extending through the holes 119 in end portion 117 of the bar. The female coupling element F1 is secured on the outside of end portion 113 of the bar by means of screws 141 extending through screw holes 143 in element F1 and threaded in tapped holes in end portion 113. The ends 105a of the metal tubes extend through spacer collars 145 received in the inner end portions 127 of the holes 121 in the female coupling element, and thence into conical-ended rubber sealing rings 147 which are compressed between the collars 145 and the conical ends 129 of portions 127 of holes 121. The female coupling element F2 is similarly secured on the end portion 117 of the bar 101, mounted opposite to element F1, and ends 105b of tubes 105 extend into the inner end portions of holes 127 in element F2, with spacer collars 145 and sealing rings 147 as described. The frame or bar 101 and tubes 105 are encased in thermal insulation 149, which is preferably a foamed insulation foamed in place after assembly of the bar 101, tubes 105 and elements F1 and F2, and testing of the assembly. A strap 150 may be provided for the tubes.

Referring to FIGS. 16—18, the T-fitting 11 is shown to comprise a rigid support designated in its entirety by the reference numeral 151, comprising a relatively wide metal bar 153 of relatively thin rectangular cross section bent to U-shape and thereby having right-angle legs 155 at the ends of a base portion 157, and a second bar 159 of similar cross section bent to U-shape and thereby having right-angle legs 161 at the ends of an intermediate base portion 163. Base portion 163 of bar 159 has a length corresponding to the width of bar 153. The U-shaped bar 159 is inverted relative to the base 157 of bar 153, and has the ends of its legs 161 suitably secured as by welding at 165 to the opposite margins of base 157 centrally of base 157 between the legs 155 of bar 153. The inverted U-shaped bar 159 is positioned transversely with respect to the base 157 of bar 153 so that the passage through the inverted U-shaped bar 159 is endwise of base 157. On the outside of legs 155 of bar 153 are female coupling elements F3 and F4 and on the outside of base 163 of bar 159 is a female coupling F5, each of these female coupling elements being identical to the female coupling elements F1 and F2. Metal tubes 167 extend between the coupling elements F3 and F4 and metal tubes 169 branching off from tubes 167 extend to the coupling element F5. Certain of the tubes 167 are bent toward the base 157 where they pass through the inverted U-shaped bar 159 so as to allow room for interconnection of the branch tubes 169 to the coupling element F5. The tubes 167 extend through holes 171 in legs 155 of bar 153 and the tubes 169 extend through holes 173 in base 163 of bar 159. The support 151 and tubes 167 and 169 are encased in thermal insulation 177, which is preferably a foamed insulation, foamed in place after assembly of the support, the tubes and the coupling elements, and testing of the assembly.

Figure 20:
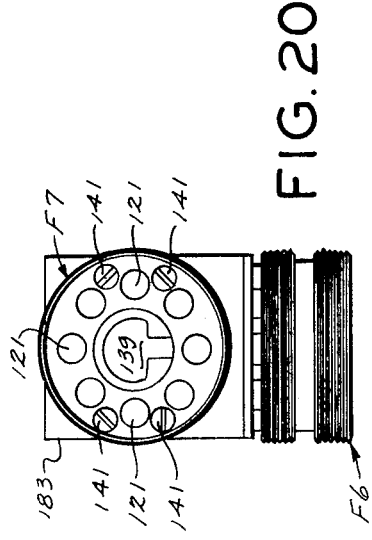
FIG. 20 is an end elevation of the FIG. 19 elbow fitting.
Figure 19:
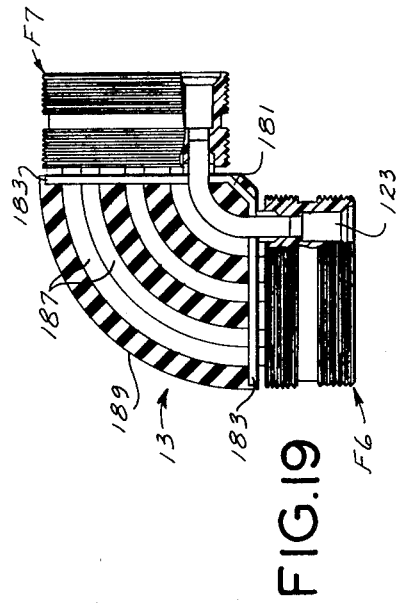
FIG. 19 is a side elevation, with parts broken away and shown in section, of a multiple-tube elbow fitting of the system.

Referring to FIGS. 19 and 20, the elbow fitting 13 comprises a rigid support 181 consisting of a relatively wide metal bar of relatively thin rectangular cross section bent to form an angle having legs 183 at right angles. On the outside of legs 183 are female coupling elements F6 and F7, each of which is identical to the female coupling elements F1—F5. Metal tubes 187 are curved to extend between the coupling elements F6 and F7. The support 181 and tubes 187 are encased in thermal insulation 189, which is preferably a foamed insulation, foamed in place after assembly of the support, the tubes and the coupling elements, and testing of the assembly.

Figure 22:
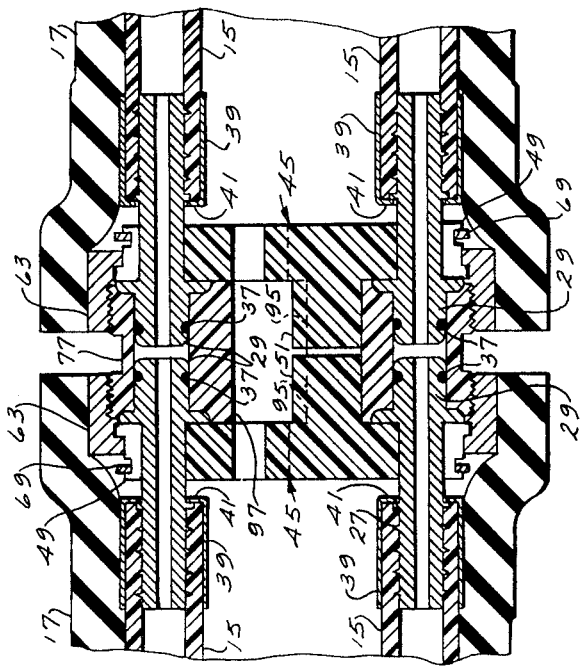
FIG. 22 is a section showing two conduits interconnected by the union of FIGS. 7—9.
Figure 21:
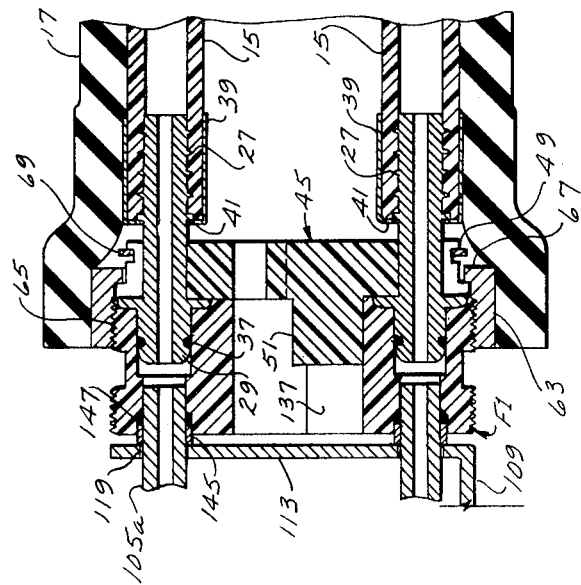
FIG. 21 is a section showing one end of a conduit connected to the coupling element of FIGS. 13—15.

The system shown in FIG. 1 is installed simply by entering the noses 29 of the terminals 21 on the coupling units 19 at the ends of conduits 9 in the sockets or terminals 123 of the female coupling elements of the S-fitting, the T-fittings and the elbows, and screwing up the coupling nuts 63, as illustrated in FIG. 21. The keys 51 are entered in the keyways 137 of the female coupling elements so that the syrup and carbonated waterlines are properly registered throughout the system. If it is desired to couple two conduits 9 together end to end, the union 77 is used to provide a female coupling element for the noses 29 of the male coupling units 19 of the two conduits which are to be coupled together, as illustrated in FIG. 22. It will be understood that a male coupling element corresponding to the unit 19 is used on the refrigeration unit 1 for connection of the upper end of the S-fitting 7, and female coupling elements corresponding to element F are used at dispensing units 3 for connection of the upper ends of riser conduits R.

When the noses 29 of the terminals 21 on a coupling unit are entered in the sockets of a female coupling element F or in the holes in a union 77, the O-ring 37 on each nose is peripherally compressed (i.e., compressed radially inward) to provide a seal. This peripheral compression of the O-rings on noses 29 for sealing purposes is attained without requiring any substantial force for such compression from the tightening of the coupling nut 63. Thus, the coupling nut may be tightened easily by hand without the use of tools, although a spanner wrench may be used if desired, even though there are eight noses entered in the sockets or holes. This is to be distinguished from an axially compressed sealing arrangement, as to which the force required to tighten the coupling nut would be excessive (noting that there would be eight seals to be axially compressed in such an arrangement). Also, the attainment of sealing by peripheral compression of the O-rings 37 on noses 29 eliminates any necessity for accurate machining of parts, as would be necessary in the case of an axially compressed sealing arrangement in order to insure substantially equal distribution of sealing force on all eight terminals. With the use of the peripherally sealing O-rings, only a simple reaming of the sockets or holes for the noses is required, and the possibility of leaks in the initial installation or due to subsequent servicing or working of a connection is materially reduced. Also, with the use of the peripherally sealing O-rings, a coupling may be disconnected and reconnected many times without having to replace the O-rings, since the only deterrent to resealing is the wear on the O-rings, which is extremely minute on each disconnection and reconnection. The use of the peripherally sealing O-rings is also particularly advantageous for the handling of carbonated water or carbonated beverages, since it enables conduction of these liquids without imposing a condition such as would tend to cause $CO_2$ to come out of solution in the coupling. Also, there are no pockets in the coupling in which syrup, water or beverage could stagnate and result in collection and multiplication of bacteria.

If one or more tubes 15 is not to be used, a plug 191 may be inserted in the respective socket 123 of the coupling unit F2 at the refrigeration unit 1 (see FIG. 10). As shown, this plug fits in the socket 123 and has an O-ring 193 like O-ring 37 for sealing the socket, with a flange 195 at its outer end.

It is to be understood that two of the tubes 15 in the conduits 9 and the respective metal tubes in the fittings may be used for recirculation of cold carbonated water (or tap water) to maintain syrups and water in the other tubes (in heat exchange relation therewith) cold through the system. That is, cold water may be continuously delivered from the refrigeration unit through a first series of tubes and returned to the refrigeration unit through a second series of tubes, and recirculated for internally cooling the conduits and fittings. In such an arrangement, recirculated carbonated water may be circulated via distribution manifolds at the upper ends of risers R, each of these being in close proximity to the respective dispensing unit 3, and carbonated water may also be supplied from these manifolds to the dispensing units for mixing with syrup, if desired.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

We claim:

1. A distribution system for a liquid-dispensing installation wherein a plurality of liquids are to be delivered from supplies thereof through a liquid temperature control unit to dispensing units each having a plurality of dispensing valves, the control unit being at location remote from the dispensing units, said system comprising a plurality of multiple-tube conduits and multiple-tube fittings for conducting the liquids from the control unit to the dispensing units, each of said conduits and each of said fittings comprising an assembly of tubes for individually conducting the respective liquids, each of said conduits including a sleeve of flexible thermal insulation material sleeved around the tubes thereof with the tubes in heat exchange relation with one another within the sleeve, each of said conduits having coupling means at the ends of the said sleeve thereof including a plurality of terminals, one for each tube in the sleeve, to which the ends of the tubes in the sleeve are connected, each of said fittings having coupling means at the ends thereof including a plurality of terminals, one for each tube in the fitting, to which the ends of the tubes in the fitting are connected, the coupling means on the conduit mating with the coupling means on the fittings, and means for interconnecting the coupling means of the conduits and the fittings.

2. A distribution system as set forth in claim 1 wherein the coupling means at each end of the conduit comprises a head, the terminals therefor each comprising a tubular element mounted in the head having an inner end portion extending inward from the head and a cylindric nose extending outward from the head, the tubes in the sleeve being connected to said inner end portions of said tubular elements, each nose having an annular peripheral groove and a resilient sealing ring in the groove, the normal external diameter of the ring being greater than the external diameter of the nose, and the coupling means at each end of each fitting comprising a body having sockets therein constituting its terminals, the tubes of the fitting being connected to said sockets, the noses being received in said sockets, the diameter of said sockets being less than the external diameter of said rings for radial compression thereof on entry into said sockets, and said interconnecting means comprising means for retaining said head on the outer end of said body with said noses entered in said sockets.

3. A distribution system for a cold-beverage-dispensing installation wherein a plurality of liquids are to be delivered from supplies thereof through a refrigeration unit to dispensing units each having a plurality of dispensing valves, the refrigeration unit being at location remote from the dispensing units, said system comprising a plurality of multiple-tube conduits and multiple-tube fittings for conducting the liquids from the refrigeration unit to the dispensing units, each of said conduits and each of said fittings comprising an assembly of tubes for individually conducting the respective liquids, each of said conduits including a sleeve of flexible thermal insulation material sleeved around the tubes thereof with the tubes in heat exchange relation with one another within the sleeve, each of said conduits having coupling means at the ends of the said sleeve thereof including a plurality of terminals, one for each tube in the sleeve, to which the ends of the tubes in the sleeve are connected, each of said fittings having coupling means at the ends thereof including a plurality of terminals, one for each tube in the fitting, to which the ends of the tubes in the fitting are connected, the coupling means on the conduit mating with the coupling means on the fittings, and means for interconnecting the coupling means of the conduits and the fittings.

4. A distribution system as set forth in claim 3 wherein the coupling means on the conduits and fittings have interengageable keying means for providing registration of tubes throughout the system.

5. A distribution system as set forth in claim 4 wherein each fitting has the tubes thereof jacketed in thermal insulation.

6. A distribution system as set forth in claim 5 comprising a multiple-tube S-fitting for downward flow of the liquids from the refrigeration unit, and multiple-tube T-fittings and elbows for interconnection of conduits to provide a main line of multiple-tube conduit extending from the lower end of the S-fitting, one or more branch lines of multiple-tube conduit extending from the main line, and multiple-tube riser conduits extending upward from the main and branch lines to the dispensing units.

7. A distribution system as set forth in claim 4 comprising multiple-tube T-fittings and elbows for interconnection of conduits to provide a main line of multiple-tube conduit extending from the lower end of the S-fitting, one or more branch lines of multiple-tube conduit extending from the main line, and multiple-tube riser conduits extending upward from the main and branch lines to the dispensing units.

8. A distribution system as set forth in claim 3 wherein the coupling means at each end of the conduit comprises a head, the terminals therefor each comprising a tubular element mounted in the head having an inner end portion extending inward from the head and a cylindric nose extending outward from the head, the tubes in the conduit being connected to said inner end portions of said tubular elements, each nose having an annular peripheral groove and a resilient sealing ring in the groove, the normal external diameter of the ring being greater than the external diameter of the nose, and the coupling means at each end of each fitting comprising a body having sockets therein constituting its terminals, the tubes of the fitting being connected to said sockets, the noses being received in said sockets, the diameter of said sockets being less than the external diameter of said rings for radial compression thereof on entry into said sockets, and said interconnecting means comprising means for retaining said head on the outer end of said body with said noses entered in said sockets.

9. A distribution system as set forth in claim 8 wherein each said head has an integral key extending outward therefrom and each said body has a keyway for receiving said key for providing registration of tubes throughout the system.

10. A distribution system as set forth in claim 8 wherein said head comprises a disc and said interconnecting means comprises a nut rotary on the disc surrounding the disc and extending outward therefrom, the body being cylindric and externally threaded for threading the nut thereon.

11. A distribution system as set forth in claim 10 wherein the disc has a reduced diameter extension on the inside thereof providing an annular shoulder, the tubular elements being mounted in slots extending radially inward from the periphery of the disc, the nut having an inwardly directed flange seated against said shoulder and surrounding said extension, and wherein a fastener is provided on said extension holding the nut in assembly with the disc while permitting it to rotate.

12. A distribution system as set forth in claim 11 wherein the extension has an annular peripheral groove and said fastener comprises a snapring received in said groove, said snapring holding said tubular elements in said slots and also holding the nut on said extension.

13. A multiple-fluid passage connection comprising a plurality of tubes, a head member, a plurality of terminals, one for each tube, mounted in the head member, each terminal having an inner end portion extending inward from one face of said head member constituting its inner face, each tube being connected to said inner end portion of a respective terminal, each terminal being tubular for flow of fluid therethrough and having a cylindric nose extending from the other face of the head member constituting its outer face, the cylindric nose of each terminal having a resilient sealing ring thereon surrounding the nose and projecting outward from the periphery of the nose, a coupling element comprising a body member having sockets therein, one for each nose, each adapted for entry of a nose therein and being dimensioned for radial compression of the sealing ring on the nose entered therein, and means for coupling said head and body members together.

14. A multiple-fluid passage connection as set forth in claim 13 wherein said coupling means comprises a nut rotary on one of said members, the other being threaded for receiving the nut.

15. A multiple-fluid passage connection as set forth in claim 13 wherein said head and body members have interengageable keying means for registration of certain terminals with certain sockets.

16. A multiple-fluid passage connection as set forth in claim 13 wherein the head member comprises a disc and wherein the coupling means comprises a nut rotary on the disc with means for holding it captive on the disc while permitting it to rotate, the nut surrounding the disc and extending axially outward therefrom, the body member being cylindric and externally threaded for receiving the nut.

17. A multiple-fluid passage connection as set forth in claim 16 wherein the terminals are mounted in slots extending radially inward from the periphery of the disc.

18. A multiple-fluid passage connection as set forth in claim 17 wherein the disc has a reduced diameter extension on its inner face providing a shoulder, the nut having an inwardly directed flange bearing against the shoulder, the extension having an annular peripheral groove, the means for holding the nut captive comprising a fastener ring received in said groove.

19. A multiple-tube conduit comprising a plurality of tubes, a head at each end of the conduit, a plurality of terminals, one for each tube, mounted in each head at each end of the conduit, each terminal being tubular for flow of fluid therethrough and having a cylindric nose extending from the outer face of the head, the cylindric nose of each terminal having a resilient sealing ring thereon surrounding the nose and projecting outward from the periphery of the nose, means on each head for coupling it to a body having sockets for receiving the noses, and a sleeve of thermal insulation surrounding said plurality of tubes extending from the head at one end to the head at the other end of the conduit.

20. A multiple-tube conduit as set forth in claim 19 wherein the coupling means comprises a nut rotary on the head, and wherein means is provided for holding the nut captive on the head while permitting it to rotate, and wherein the thermal insulation sleeve extends over the nuts at each end of the conduit and the material of the sleeve is soft and resilient to enable the ends of the sleeve to be squeezed back off the nuts,.

21. A multiple-tube conduit as set forth in claim 20 having a key extending outward from each head for reception in a keyway in said body.

22. A multiple-tube conduit as set forth in claim 20 wherein the head comprises a disc and the nut surrounds the disc and extends axially outward therefrom, the terminals being mounted in slots extending radially inward from the periphery of the disc.

23. A multiple-tube conduit as set forth in claim 22 wherein the disc has a reduced diameter extension on its inner face providing a shoulder, the nut having an inwardly directed flange bearing against the shoulder, the extension having an annular peripheral groove, the means for holding the nut captive comprising a fastener ring received in said groove.

24. A multiple-tube fitting comprising a rigid support, coupling elements carried by the support spaced each comprising a body having a plurality of terminals, a plurality of tubes carried by the support extending between the terminals, and thermal insulation surrounding the tubes.

25. A multiple-tube fitting as set forth in claim 24 wherein the support comprises a bar bent to have an end portion extending back toward the other end of the bar, and having a coupling element mounted on the outside of said bent-back end portion and a coupling element mounted oppositely thereto at the other end of the bar, the fitting thereby being an S-fitting.

26. A multiple-tube fitting as set forth in claim 24 wherein the support comprises a first bar having end portions bent at right angles to an intermediate portion of the bar, and a second bar of U-shape having a base and legs mounted transversely of the intermediate portion of the first bar in inverted position, having coupling elements mounted on the outside of said end portions of the first bar and the base of the second bar, and tubes extending between the coupling elements on said end portions of the first bar and tubes branching therefrom extending to the coupling element on the base of the second bar, the fitting thereby being a T-fitting.

27. A multiple-tube fitting as set forth in claim 24 wherein the support comprises a bar bent to have legs at an angle to one another, and having a coupling element mounted on the outside of each leg, the fitting thereby being an elbow fitting.